Patented Nov. 6, 1951

2,573,741

UNITED STATES PATENT OFFICE 2,573,741

DERIVATIVES OF PARAHYDROXY-PENICILLIN G

Frank H. Stodola, Peoria, Ill., Jacques L. Wachtel, Lawrenceburg, Ind., and Robert D. Coghill, Lake Bluff, Ill.; dedicated to the People of the United States of America No Drawing. Original application June 13, 1945, Serial No. 599,300. Divided and this application March 3, 1950, Serial No. 147,572

6 Claims. (Cl. 260—239.1)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes throughout the world without the payment to us of any royalty thereon.

This invention relates to compounds of the penicillin family. This application is a division of Serial No. 599,300, filed June 13, 1945, and granted as Patent No. 2,504,161.

The antibacterial material commonly known as penicillin is produced by the cultivation of certain molds such as *Penicillium notatum*, *Penicillium chrysogenum*, *Aspergillus flavus*, *Aspergillus niger*, and so forth, in suitable culture medium. The term "penicillin" includes a number of compounds (at least five) produced by this method and is regarded as a generic term. Species of penicillin include penicillin F, dihydro penicillin F, flavicin or flavicidin, and penicillin X. The latter, first isolated by us, is also known as parahydroxypenicillin G. See Trans. Am. Inst. Chem. Eng. 40, 747 (1944); Chem. Inst. Eng. 51, 94 (1944); American Medical Association 126, 1024 (1944) and Science 101, 27 (1945).

It is an object of this invention to provide derivatives of p-hydroxypenicillin G having modified therapeutic properties relative to the original penicillin species.

In general, the new compounds of this invention possess greater anti-bacterial action against *Staphylococcus aureus* than the original penicillin species from which they are made and therefore may be used in smaller amounts for comparable therapeutic results.

Parahydroxypenicillin G has the molecular formula $C_{16}H_{18}O_5N_2S$ and the structural formula

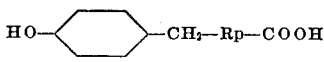

where Rp is a grouping defined as $C_8H_{10}SN_2O_2$ and is common to all compounds of the penicillin family. This part of the structure does not chemically affect the reactions employed in preparing our new compounds, and, therefore, it is not necessary that the true structural formula be known. For convenience, it will herein be referred to as Rp. The probable structural formula of Rp is as follows:

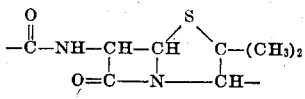

In general, our invention comprises compounds of the general formula

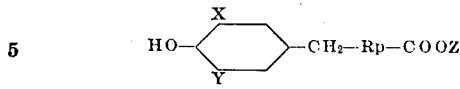

where X may be hydrogen or halogen; Y may be hydrogen, halogen, or one of the radicals —N=N—W or —NH—NH—W, where W is aromatic, heterocyclic, substituted aromatic or substituted heterocyclic; at least either X or Y, being other than hydrogen, and where Z may be H, Na, K, $$\frac{Ca}{2}, \frac{Mg}{2}, \frac{Ba}{2}, \text{ or } NH_4$$

This application relates particularly to the above class of compounds in which X may be hydrogen or halogen, and Y may be hydrogen or halogen, at least one of X or Y being halogen. Specific compounds of this type comprise the following as such or in the forms of their salts or esters:

3-bromo-4-hydroxypenicillin-G
3,5-dibromo-4-hydroxypenicillin-G
3-iodo-4-hydroxypenicillin-G
3,5-diiodo-4-hydroxypenicillin-G
3-chloro-4-hydroxypenicillin-G The following examples illustrate the manner in which compounds of this type may be prepared. Each example includes assay values obtained by the turbidimetric method of assay using *Staph. aureus* as the test organism and the sodium salt of penicillin G as a standard. The assay values of the new compounds are to be compared with the values of 1,667 $\mu$/mg. for penicillin G and 845 $\mu$/mg. for penicillin X.

EXAMPLE 1

*Preparation of 3,5-diiodo-4-hydroxypenicillin G*

The sodium salt of penicillin X (200 mg.) was dissolved in 2.00 cc. of water containing 136 mg. (3 moles) of sodium bicarbonate. To this was added dropwise at room temperature over a period of 25 minutes, 4.35 cc. (4 equivalents) of $I_2$—KI solution (0.495 N). The dark brown solution was allowed to stand for 40 minutes. The excess iodine was removed with sulfurous acid. The solution was brought to pH 2 with phosphoric acid after cooling to 0° C. The acid solution was extracted twice with ethyl acetate. The brownish ethyl acetate extracts were diluted with an equal volume of ether and applied to a silica gel-buffer (pH 6.4) column. The column was developed with 50 percent ethyl acetate-ether. The course of the separation was followed by testing the ability of successive percolate fractions to couple with diazotized sulfanilic acid. The first percolates gave no coloration with this reagent and were shown by plate assay to have no activity. Following this, there appeared a zone which reacted strongly to give a deep red color and the intensity of this color was roughly proportional to the activity as shown by assay. This zone contained approximately 160,000 units $$\left(\frac{B.\ subtilis}{Staph.\ aureus}\ \text{ratio}=0.30\right)$$

Continued development caused the intensity of the color to diminish. The column was then extruded and cut into six equal sections. Differential assay, as well as total units in each section, indicated a top zone of unchanged penicillin X. A lower band contained what was later shown to be mono-iodo penicillin X.

The active zone in the percolate was converted to the sodium salt by extraction with $NaHCO_3$ to pH 7.3. Lyophilization gave 122 mg. of a white powder. A sample (102 mg.) of this material was treated with anhydrous methanol in order to remove excess $NaHCO_3$ and then centrifuged. The bulky gelatinous precipitate was washed three times with methanol and the washings added to the original methanol extract. The extracts were cooled and ethyl acetate and a small amount of water added. The precipitate was separated by centrifugation (weight 77 mg.). This product was dissolved in the minimum amount of 80–20 n-butyl alcohol-water at 35°–40° C. (It was necessary to add some dry butyl alcohol from time to time to keep the solution homogeneous.) Long needles separated at room temperature. After being cooled to 0° C., the solution was centrifuged in the ice box, washes of butanol and then ethyl acetate being used. The crystals were removed by filtration, ethyl acetate being used for the transfer. The crystals were dried at room temperature (0.1 mm.). Weight 45 mg. Found 7.6 percent butoxyl. The assay by plate (corrected for butanol) 1,715 $\mu$/mg. vs. *Staph. aureus*. 535 $\mu$/mg. vs. *B. subtilis* (rough).

An attempt to remove butanol from a sample at 70 percent relative humidity was unsuccessful because the material became gummy. The remaining 38 mg. was dissolved in the minimum amount of 80–20 acetone-water at room temperature. Addition of acetone to cloudiness gave long needles. Filtration gave 34 mg. of pure white crystals which showed no alkoxyl on Zeisel determination. The material appeared to have solvent of crystallization, a part of which was retained even at 78° C. (0.1 mm.). Moreover, the phenolic hydroxyl had apparently formed a sodium salt. Analyses agreed fairly well with those of a di-sodium salt of diiodo penicillin X with two molecules of acetone of crystallization.

| | C | H | I | Na |
|---|---|---|---|---|
| Calc. for $C_{22}H_{26}O_7N_2SI_2Na_2$ (M. W. 762) | 34.66 | 3.44 | 33.29 | 6.03 |
| Found | 34.40 | 3.56 | 33.00 | 6.19 |

The assay values were:

Plate method 1,150 $\mu$/mg.
Turbidimetric method 1,130 $\mu$/mg.

Hence, on a molal basis, this diiodo penicillin shows 870 $\mu$/micro-mole. It is, therefore, $$\frac{870}{310}$$

or 2.8 times as active as the penicillin X from which it was made.

EXAMPLE 2

*Preparation of 3-bromo-4-hydroxy penicillin G*

A solution of 37 mg. of the sodium salt of para-hydroxypenicillin G in 0.60 ml. of absolute methanol was cooled to 0° C. To this was added dropwise 0.58 ml. of an ice-cold solution of bromine-sodium bromide in methyl alcohol (2.0 equivalents of bromine). After two minutes, 0.75 ml. of water, 1.5 ml. of ethyl acetate, and sufficient phosphoric acid to bring the pH to 2.0 were added, and the total well shaken. Two extractions were made with 1.5 ml. portions of ethyl acetate. The extracts were separated, combined, and washed twice with half volumes of water, the washings being discarded. The mono-bromo derivative of p-hydroxypenicillin G was converted to the sodium salt by extracting the ethyl acetate solution with 5 percent aqueous solution of sodium bicarbonate to pH 6.75. The aqueous phase was separated and dried by lyophilization, yielding 37 mg. of a white powder. The plate assay values were:

1,190 $\mu$/mg. vs. *Staph. aureus* (536 $\mu$/micro-mole)
930 $\mu$/mg. vs. *B. subtilis* (rough)
610 $\mu$/mg. vs. *B. subtilis* (smooth)

Thirty-one thousand units (*Staph. aureus*) were used for the experiment; 44,000 units of activity were recovered.

The percentage of bromine found was 13.4; the calculated value is 17.7.

Due to the instability of penicillin, careful attention must be paid to the reaction conditions, such as temperature, pH, time of reaction, and relative amounts of reactants. We have found, for example, that the bromination is best conducted at low temperature (0°–15° C.) in order to reduce destruction of the penicillin molecule. The iodination can safely be carried out from 0°–30° C. The coupling reactions are best conducted at 0° C. If the coupling proceeds at a suitable rate at that temperature. If the reaction is too slow at 0° C., it can be run as high as 30° C. However, at the elevated temperature, there is a spontaneous decomposition of the diazonium salt which must be compensated for by the use of a proportionately large amount of this material.

pH control is of especial importance in all of these reactions. It is preferred to operate between the limits of pH 6 to 8 by using suitable buffers or $NaHCO_3$, although it is possible to work within the wider range of pH 5 to 9.

It is important to work as rapidly as possible at zero degrees whenever solutions of the sodium salt of these azopenicillins are acidified to pH 2 with phosphoric acid to permit extraction into an organic solvent. The rate of destruction of all penicillins at this pH is very rapid.

A variety of organic solvents immiscible with water has been found suitable for extracting these modified penicillins from the acidified reaction mixture. Ethyl acetate, butyl acetate, amyl acetate, ethyl ether, and chloroform have given effective extraction, the esters being especially useful in this respect. Higher alcohols such as butyl alcohol, amyl alcohol, and octyl alcohol are useful, as are also ethers, such as ethyl ether and isopropyl ether. Extraction of these modified penicillins by a solvent immiscible with water and possessing the ability to dissolve these penicillins is within the scope of our invention. Batch extraction with two or three equal-volume portions of solvent serves to separate substantially all the modified penicillins from the reaction mixture. Continuous extraction or countercurrent extraction may be employed if it is desired to use less solvent.

The solutions of the modified penicillins in the organic solvent, after washing with water, are suitable for the preparation of salts of the penicillins by reaction of the free acid with metallic bases, such as oxides, hydroxides, bicarbonates, or carbonates. This is conveniently accomplished by contacting or extracting the solution of the free acid in the organic solvent with aqueous solutions or suspensions of a selected metallic base. The quantity of base employed should be substantially chemically equivalent to the modified penicillin being reacted, so as to leave no excess of the metallic base. The maintenance of this chemical equivalency is especially important when water-soluble metallic bases are used. If a water-insoluble metallic base is employed in excess of a chemically equivalent quantity, and if the salt produced is water soluble, this salt may be separated from the excess metallic base by filtration or decantation. The use of sodium bicarbonate for the preparation of the sodium salts and the use of calcium carbonate for the preparation of the analogous calcium salt are especially applicable. When sodium bicarbonate is employed, it is conveniently added in portions (in the solid form) to the aqueous phase, while it is in contact with the organic solvent solution, until the pH of the aqueous phase is about 7.0 in the case of the halogenated penicillins and about 8.0 in the case of the azopenicillins.

When the modified penicillins have been obtained as the salts in aqueous solution by this extraction process, it is essential that they be converted to the dry powdered form as soon as possible because of the instability of penicillins in aqueous solution. We have obtained good results by lyophilizing the aqueous solution, namely, by freezing this solution and then removing the water from the frozen mass by vacuum drying.

Although, in the above examples, only the formation of the sodium salts of the particular penicillin derivatives is referred to, other salts may be formed such as the calcium, magnesium, barium, ammonium, and potassium, by simple methods well known in the art for forming such salts of carboxylic acids. Compounds such as calcium carbonates, potassium bicarbonate, magnesium hydroxide, ammonium hydroxide, and barium carbonate may be used to furnish the cation for forming the salt.

We claim:

1. A derivative of parahydroxypenicillin G having the general formula

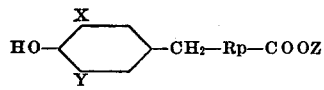

where X is a member of the group consisting of hydrogen and halogen; Y is a member of the group consisting of hydrogen and halogen, at least one of X and Y being halogen; Rp being the radical common to compounds of the penicillin family and having the probable structural formula

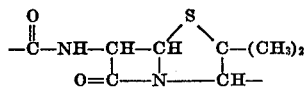

and Z being a member selected from the group consisting of H, Na, K,

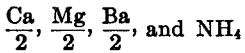

2. 3-bromo-4-hydroxypenicillin-G.
3. 3,5-dibromo-4-hydroxypenicillin-G.
4. 3-iodo-4-hydroxypenicillin-G.
5. 3,5-diiodo-4-hydhoxypenicillin-G.
6. 3-chloro-4-hydroxypenicillin-G.

FRANK H. STODOLA.
JACQUES L. WACHTEL.
ROBERT D. COGHILL.

REFERENCES CITED

The following references are of record in the file of this patent:

Lilly Report CMR–L–21, January 11, 1945, p. 4.
Lilly Report CMR–L–25, April 15, 1945, pp. 1 and 2.